United States Patent
Usoro et al.

(10) Patent No.: US 8,025,339 B2
(45) Date of Patent: Sep. 27, 2011

(54) ACTIVE MATERIAL BASED SEATBELT WEBBING PRESENTER

(75) Inventors: Patrick B. Usoro, Troy, MI (US); Alan L. Browne, Grosse Pointe, MI (US); Steven G. Corrion, Oxford, MI (US); Xiujie Gao, Troy, MI (US); Nancy L. Johnson, Northville, MI (US); Nilesh D. Mankame, Ann Arbor, MI (US); Lawrence C. Maugh, Ann Arbor, MI (US)

(73) Assignee: GM Global Technology Operations, LLC, Detroit, MI (US)

(*) Notice: Subject to any disclaimer, the term of this patent is extended or adjusted under 35 U.S.C. 154(b) by 75 days.

(21) Appl. No.: 12/556,146

(22) Filed: Sep. 9, 2009

(65) Prior Publication Data

US 2010/0066151 A1    Mar. 18, 2010

Related U.S. Application Data

(60) Provisional application No. 61/097,501, filed on Sep. 16, 2008.

(51) Int. Cl.
| | |
|---|---|
| *A62B 35/00* | (2006.01) |
| *A62B 35/04* | (2006.01) |
| *B60R 21/013* | (2006.01) |
| *B60R 21/0132* | (2006.01) |
| *B60R 22/00* | (2006.01) |
| *B60R 22/03* | (2006.01) |
| *B60R 22/04* | (2006.01) |

(52) U.S. Cl. ......................................................... 297/481
(58) Field of Classification Search .................... 297/481
See application file for complete search history.

(56) References Cited

U.S. PATENT DOCUMENTS

| | | | |
|---|---|---|---|
| 6,578,916 B2 * | 6/2003 | Longhi et al. ............... | 297/284.3 |
| 6,883,834 B2 * | 4/2005 | Grabowski et al. ........ | 297/481 X |
| 7,823,972 B2 * | 11/2010 | Browne et al. ............. | 297/217.2 |
| 2006/0181073 A1 * | 8/2006 | Sugiyama et al. ......... | 297/481 X |
| 2006/0289220 A1 * | 12/2006 | Oota et al. ................. | 297/481 X |
| 2009/0218859 A1 * | 9/2009 | Lawall et al. .............. | 297/216.1 |

FOREIGN PATENT DOCUMENTS

| | | |
|---|---|---|
| DE | 199 48 020 A1 | 12/2001 |
| DE | 10204940 A1 | 11/2003 |
| DE | 102005017750 A1 | 10/2006 |
| DE | 60226008 T2 | 7/2008 |

* cited by examiner

*Primary Examiner* — Rodney B White

(57) ABSTRACT

A safety belt webbing presenter including an active material actuator configured to selectively cause a webbing engaging mechanism to translate between deployed and stowed conditions, wherein the deployed condition, the mechanism engages a safety belt webbing causing it to translate to a more readily fastened position.

21 Claims, 5 Drawing Sheets

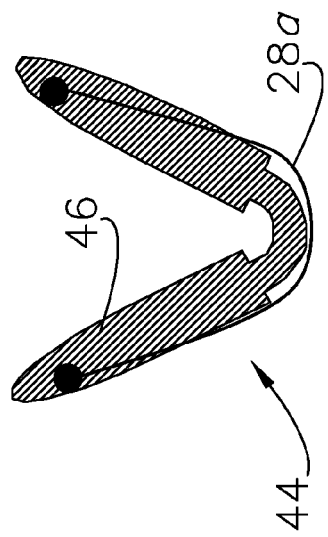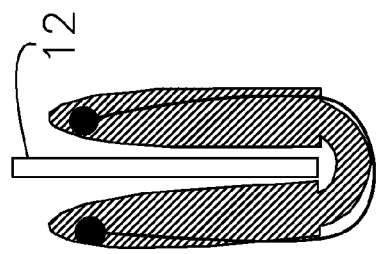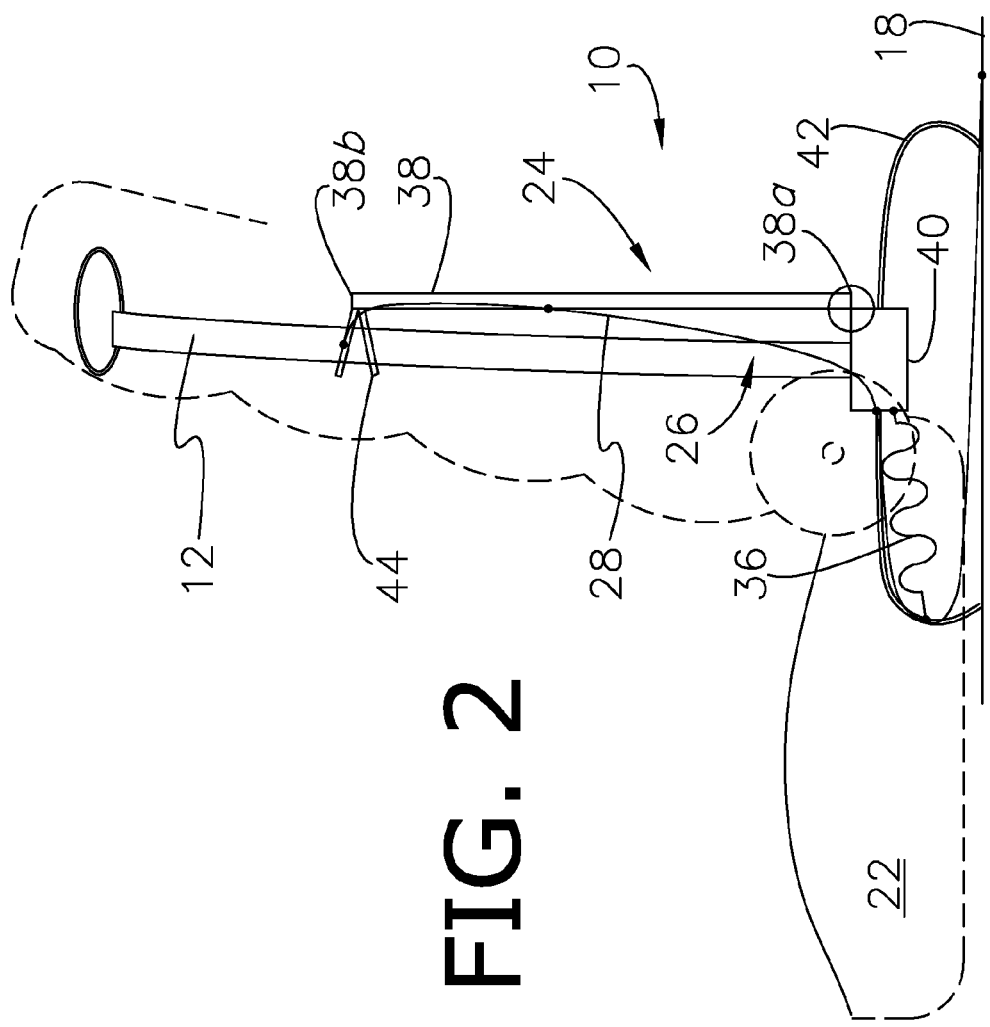

ACTIVE MATERIAL BASED SEATBELT WEBBING PRESENTER

RELATED APPLICATIONS

This patent application claims priority to and benefit from U.S. Provisional Patent Application Ser. No. 61/097,501, entitled "SAFETY BELT WEBBING PRESENTMENT UTILIZING ACTIVE MATERIAL ACTUATION," and filed on Sep. 16, 2008, the disclosure of which is incorporated by reference herein.

BACKGROUND OF THE INVENTION

1. Field of the Invention

This disclosure generally relates to safety belts and more particularly, to active material based safety belt presenters.

2. Discussion of Prior Art

Safety belts have long been developed as part of safety systems used, for example, in automotive applications. These systems generally consist of a safety belt composing a webbing. The belt is presented at the side of the seat and extended over the lap or chest of an automotive seat and clasped by a belt buckle. This forms a continuous restraint that surrounds and protects a seated occupant, for example, during sudden stop automotive conditions. Concernedly, these systems have traditionally been fixedly configured, which presents a trade-off. That is to say, either the belt is readily accessible and always visible, or difficult to access and in a more discreet location.

More recently, mechanically or electromechanically driven presenters have been developed that selectively cause at least a portion of the webbing to translate from a discreet location and to a more readily accessible and visible location. These types of systems, however, also present concerns in the art, including for example the need for often bulky and noisy mechanical actuators such as motors, and solenoids that take up packaging space in the tight confines adjacent the seat. Moreover, conventional safety belt presenters often require separate locking means to retain the webbing in the deployed or stowed condition.

BRIEF SUMMARY OF THE INVENTION

Responsive to these and other concerns, the present invention recites an active material based safety belt webbing presenter configured to selectively cause the webbing to shift between deployed and stowed conditions. As such, the invention is useful, among other things, for more efficiently aiding physically impaired users (e.g., the disabled, the elderly, children, etc.) in fastening their seat belt, and serves to remind and increase convenience for all users. The use of active material actuation is useful for reducing actuator packaging requirements, presenting fewer parts, and providing less noise (both acoustically and with respect to EMF) during operation, in comparison to conventional safety belt presenters.

The invention generally concerns an autonomously functioning safety belt webbing presenter, adapted for use with a structure, such as a vehicular seat. The presenter includes an actuator including at least one active material element operable to undergo a reversible transformation in fundamental property when exposed to or occluded from an activation signal. The actuator is drivenly coupled to the presenter and fixed structure, and operable to translate the presenter, as a result of the change. The invention further includes a source operable to generate the signal, so as to expose the elements thereto, and at least one sensor configured to detect a condition, and communicatively coupled to the actuator and source. The sensor and source are cooperatively configured to generate the signal only when the condition is detected.

Other aspects and advantages of the present invention, including the employment of a presenter arm, shape memory alloy wire actuator, latching mechanism, claspable fingers, sliders, and various configurations of active material based presenters are also disclosed. The disclosure may be understood more readily by reference to the following detailed description of the various features of the disclosure and the examples included therein.

BRIEF DESCRIPTION OF THE SEVERAL VIEWS OF THE DRAWING

A preferred embodiment(s) of the invention is described in detail below with reference to the attached drawing figures of exemplary scale, wherein:

FIG. 2 is a side elevation of a seat and safety belt webbing presenter, including a slider, guide rail, swing arm, and fingers, in accordance with a preferred embodiment of the invention;

FIG. 2a is a cross-section of the fingers shown in FIG. 2, in an opened condition, wherein the active material element has been activated;

FIG. 2b is a cross-section of the fingers shown in FIG. 2, in a normally clasped condition, wherein the active material element is deactivated;

DETAILED DESCRIPTION OF THE INVENTION

Figure 1:
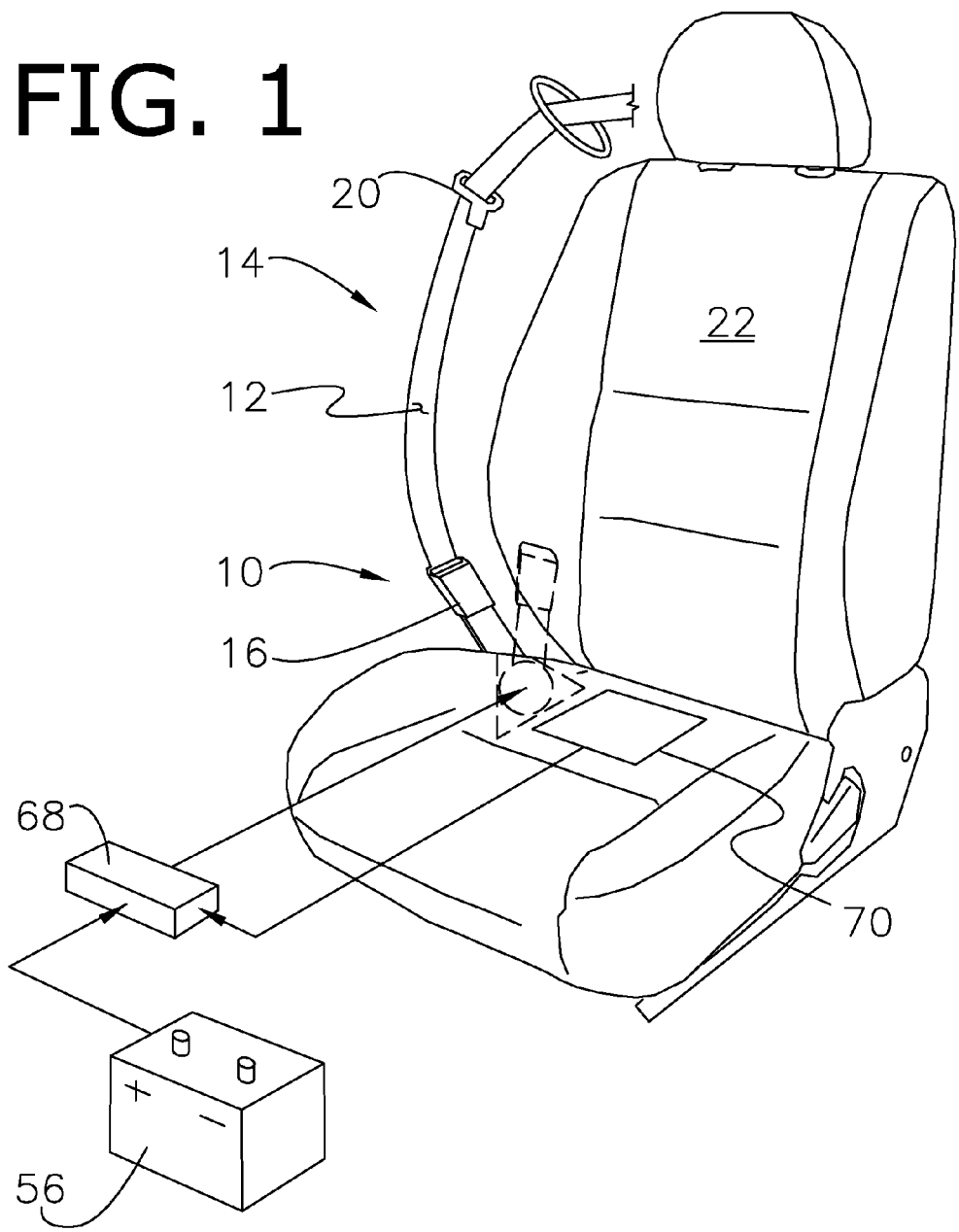
FIG. 1 is a perspective view of an automotive seat having a safety belt system including an active material actuated webbing presenter comprising a rotating sleeve, in accordance with a preferred embodiment of the invention.

The present invention concerns an autonomously functioning safety belt webbing presenter 10 and methods of selectively deploying (i.e., presenting), and stowing a safety belt webbing 12 utilizing active material actuation. As shown in FIGS. 1-6b, the presenter 10 is adapted for use with a seat belt safety system 14, such as those employed in automotive and/or aviation applications. The system 14 includes a buckle (not shown), the safety webbing 12, a pre-tensioning sleeve 16 which surrounds one end of the webbing 12 and interconnects the belt to a fixed structure (e.g., a frame member of the associative passenger seat, or floor of a vehicle, etc.) 18, and a durable fastener (e.g., buckle tongue) 20 coupled to the webbing 12 and configured to be inserted within the buckle, so as to form a fastened connection. When fastened, a tensioner (also not shown) causes the webbing 12 to form a surrounding restraint around an occupant. Although depicted and described with respect to a passenger seat 22, it is appreciated that the inventive presenter 10 may be used wherever facilitating the use of a safety belt system is desired.

I. Active Material Discussion and Function

As used herein the term "active material" shall be afforded its ordinary meaning as understood by those of ordinary skill in the art, and includes any material or composite that exhibits a reversible change in a fundamental (e.g., chemical or intrinsic physical) property, when exposed to an external signal source. Thus, active materials shall include those compositions that can exhibit a change in stiffness properties, shape and/or dimensions in response to the activation signal, which can take the type for different active materials, of electrical, magnetic, thermal and like fields.

Suitable active materials for use with the present invention include but are not limited to shape memory materials such as shape memory alloys (SMA), electroactive polymers (EAP), ferromagnetic SMA's, electrostrictives, magnetostrictives, piezoelectric polymers, piezoelectric ceramics, various combinations of the foregoing materials, and the like. Shape memory materials generally refer to materials or compositions that have the ability to remember their original at least one attribute such as shape, which can subsequently be recalled by applying an external stimulus. As such, deformation from the original shape is a temporary condition. In this manner, shape memory materials can change to the trained shape in response to an activation signal. Amongst suitable materials, SMAs and EAPs are further described herein.

Shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or martensite phase, shape memory alloys can be plastically deformed and upon exposure to some higher temperature will transform to an austenite phase, or parent phase, returning to their shape prior to the deformation.

Shape memory alloys exist in several different temperature-dependent phases. The most commonly utilized of these phases are the so-called Martensite and Austenite phases discussed above. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$).

When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). Generally, the shape memory alloys are softer and more easily deformable in their martensitic phase and are harder, stiffer, and/or more rigid in the austenitic phase. In view of the foregoing, a suitable activation signal for use with shape memory alloys is a thermal activation signal having a magnitude to cause transformations between the martensite and austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the shape.

Intrinsic and extrinsic two-way shape memory materials are characterized by a shape transition both upon heating from the martensite phase to the austenite phase, as well as an additional shape transition upon cooling from the austenite phase back to the martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Thus, for the purposes of this invention, it is appreciated that SMA's exhibit a modulus increase of 2.5 times and a dimensional change of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. Joule heating can be used to make the entire system electronically controllable. Stress induced phase changes in SMA are, however, two way by nature. Application of sufficient stress when an SMA is in its Austenitic phase will cause it to change to its lower modulus Martensitic phase in which it can exhibit up to 8% of "superelastic" deformation. Removal of the applied stress will cause the SMA to switch back to its Austenitic phase in so doing recovering its starting shape and higher modulus.

Ferromagnetic SMA's (FSMA's), which are a sub-class of SMAs, may also be used in the present invention. These materials behave like conventional SMA materials that have a stress or thermally induced phase transformation between martensite and austenite. Additionally FSMA's are ferromagnetic and have strong magnetocrystalline anisotropy, which permit an external magnetic field to influence the orientation/fraction of field aligned martensitic variants. When the magnetic field is removed, the material may exhibit complete two-way, partial two-way or one-way shape memory. For partial or one-way shape memory, an external stimulus, temperature, magnetic field or stress may permit the material to return to its starting state. Perfect two-way shape memory may be used for proportional control with continuous power supplied. One-way shape memory is most useful for rail filling applications. External magnetic fields are generally produced via soft-magnetic core electromagnets in automotive applications, though a pair of Helmholtz coils may also be used for fast response.

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly (poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarbo46lic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric materials can comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof and Group VIA and IIB compounds, such as CdSe, CdS, G68s, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

II. Exemplary Configurations, Methods, and Applications

Turning to the structural configuration of the invention, various embodiments of an active safety belt webbing presenter 10 is shown in FIGS. 1-6b. Throughout the illustrated embodiments, the presenter 10 includes a webbing engaging mechanism 24, which is translatably connected to the fixed structure 18, so as to be able to achieve deployed and stowed conditions relative thereto. That is to say, the mechanism 24 may be pivotally, flexibly, or slidingly attached, or coupled by a reconfigurable apparatus, body, or assembly to the structure 18, such that its spatial positioning can be adjusted without detaching the mechanism 24 from the structure 18. As such, the term "translatable" shall be deemed to include pivotal, rotatable, telescoping, sliding, reconfigurable, and other dynamic actions. The engaging mechanism 24 may be an externality to the system 14 (e.g., the swing arm configuration of FIG. 2), or compose the system 14 (e.g., the reconfigurable sleeve configuration of FIGS. 1, and 5-6). The various embodiments presented may be used singularly or in combination with other approaches, so as to reduce the individually required force.

The presenter 10 includes an actuator 26 that utilizes at least one element 28 comprising an active material as generally described in Part (I). When the material is activated or deactivated (e.g., where a thermally activated material is exposed to transformational heat energy or caused to undergo Joule heating by an electric current, a magnetorestrictive element is exposed to a magnetic field, or a stress activated element is exposed to a transformational force), the actuator 26 is configured to create a driving force. The actuator is coupled to the mechanism 24, such that the force is operable to cause the mechanism 24 to translate, reconfigure, or otherwise shift to the deployed or stowed condition.

Figure 3:
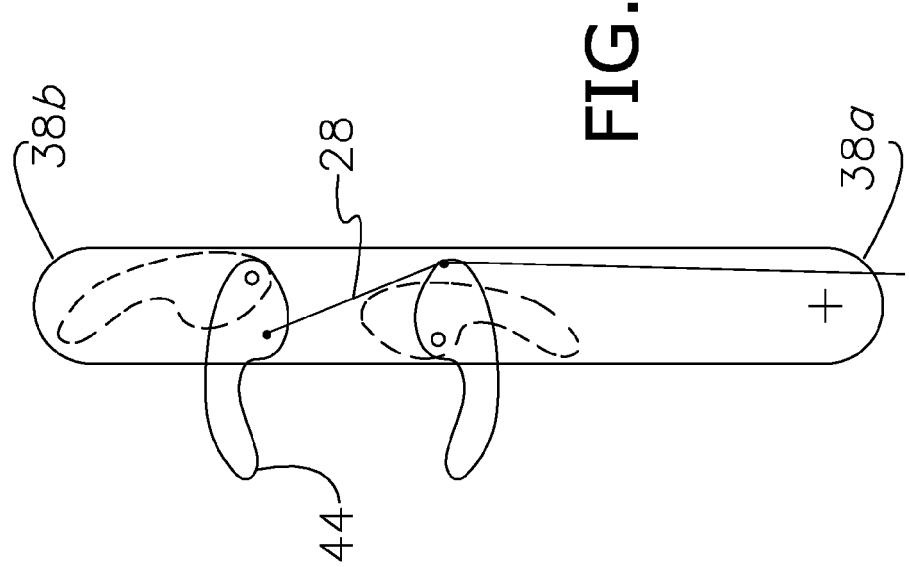
FIG. 3 is a schematic elevation of a seat belt webbing presenter including a gear/pulley, shape memory bundle actuator, strain relief system, return spring, and power source, in accordance with a preferred embodiment of the invention.

As shown in FIGS. 3 and 5, the preferred presenter 10 includes a strain relief mechanism 30 configured to relieve stress/strain within the element 28 when deployment of the mechanism 24 is blocked. The illustrated strain relief mechanism 30 is operatively connected between the element 28 and fixed structure 18, and functions to provide a secondary work output path, so as to relieve the element 28 of excess stress and strain. More particularly, in the illustrated embodiment, a strain relief spring 32 is mechanically connected in series to the element 28, and presents a sufficiently stiff spring constant that allows normal actuation and manipulation of the mechanism 24 when unblocked, but is stretchable by the element 28 when the actuation force exceeds a predetermined greater-than-normal threshold (which occurs when the mechanism 24 is unable to move). A lever (not shown) may also be provided to add mechanical advantage to the spring 32 and/or facilitate packaging.

Figure 5A:
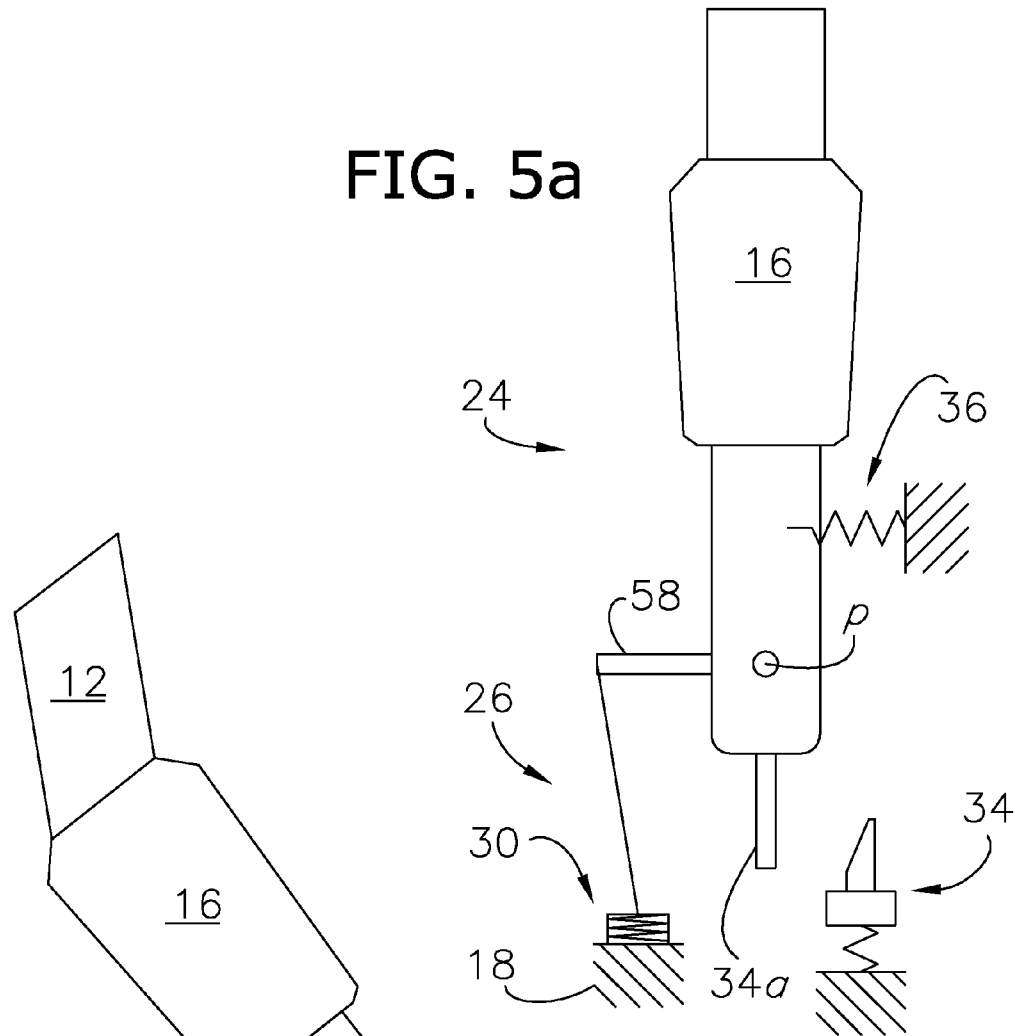
FIG. 5a is a side elevation of a seat belt webbing presenter including a pivotal anchor or lap pretensioner sleeve engaging the webbing, and a shape memory wire actuator and latch, shown in a stowed condition, in accordance with a preferred embodiment of the invention.
Figure 5B:
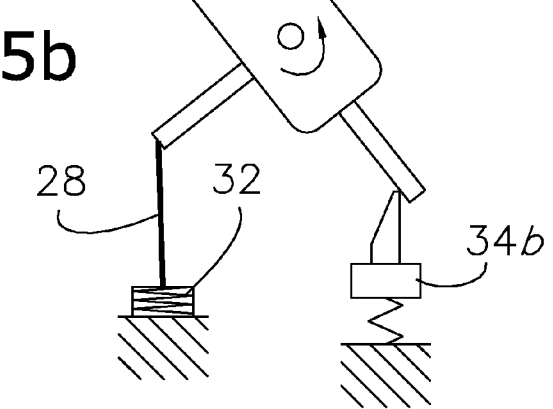
FIG. 5b is a side elevation of the presenter shown in FIG. 5a, wherein the actuator has been activated, the latch engaged, and the sleeve has been caused to achieve a deployed condition.

The preferred presenter 10 also includes a latching mechanism 34, such as an electromagnetic latch, permanent magnet latch, MR based latch, an active material actuated spring loaded pin latch, or other suitable latch. For example, and as shown in FIG. 5, a pin 34a may be attached to the sleeve 16 and caused to engage a catch 34b when in the deployed condition (FIG. 5b). Alternatively, it is appreciated that a pawl and toothed bar or gear may be coupled to the mechanism 24 and structure 18, and configured to selectively prevent motion in at least one direction.

Where one-way actuation is provided, at least one return spring 36 is antagonistically coupled to the actuator 26 and operable to cause the mechanism 24 to return to the original condition when the element 28 is deactivated (FIGS. 2, 3, and 5a). Finally, it is appreciated that additional springs and/or dampers (not shown) may be incorporated to enhance the smoothness of webbing presentment.

In a first embodiment shown in FIG. 2, the engaging mechanism 24 includes a translatable arm 38 that is driven by a shape memory wire element 28; however, it is certainly understood in this configuration and throughout the plural embodiments described herein, that use of the form "wire" is exemplary, such that the element 28 may present other suitable geometric shapes/configurations, including, for example, springs, strips, cables, and rolled sheets. At the proximal end 38a, the arm 38 is pivotally coupled to a slider 40 that rides along a guide rail 42. The guide rail 42 is fixedly connected to fixed structure 18. At the distal end 38b of the arm 38, at least one and more preferably a plurality of fingers 44 are configured to entrain the safety webbing 12. More preferably, the actuator 26 is drivenly coupled to the slider 40 and the arm 38 such that activation causes the slider 40 to translate and the arm 38 to pivot to the deployed condition. Alternatively, it is appreciated that activation may be configured such that the arm 38 and/or slider 40 are caused to achieve the stowed condition. Also, it is appreciated that compression and torsional return spring(s) 36 may be drivenly coupled to the slider 40 and arm 38, respectively. Finally, it is appreciated that this embodiment can be implemented without the slider 40, but with the arm 38 hinged to the fixed structure 18.

Most preferably, in this configuration, upon activation of the element 28, the change in fundamental property causes the slider 40 to slide forward along guide rail 42, the arm 38 to pivot forward toward the occupant, and the fingers 44 to separate into an open condition. After the activation signal is ended, the return spring(s) 36 act to move the slider 40 and arm 38 back to the stowed condition, and the fingers 44 to the clasped condition. Thus, it is appreciated that a single element 28 may be used to actuate the slider 40, arm 38, and fingers 44.

In FIGS. 2a and 2b, a separate element 28a is configured to cause the fingers 44 to achieve the open and clasped conditions. Here, a flexure 46 is coupled to or defines the fingers 44 and presents zero stress in the clasped condition (FIG. 2b). The element 28a is coupled to the outside of the flexure 46 so that upon activation, the flexure 46 is caused to "flex" and open, as shown in FIG. 2a. It is appreciated that in this condition, the fingers 44 are able to more facilely engage the webbing 12; thereby making activation preferable just prior to actuating the main actuator 26. When the activation signal ends, the flexure 46 reverts back to the zero stress position of FIG. 2b. In this configuration, it is appreciated that the fingers 44 are better able to be stored.

In the preferred embodiment depicted in FIG. 3, the arm 38 is drivenly coupled to an actuator 26 comprising a plurality of SMA wires 48 preferably in cooperatively functioning cable or bundle configuration, and an amplification mechanism 50. The mechanism 50 may include at least one lever (not shown), linkage (also not shown), gear 52, and/or pulley 54, and be operable to amplify either displacement or force, depending upon the available actuation stroke. Alternative embodiments could use other equivalent displacement devices to achieve large displacement when activating the actuator 26. A return spring 36 connects the presenter arm 38 with the structure 18 and works to return the arm 38 to the stowed condition. When the SMA wire bundle 48 is sufficiently cooled, the return spring 36 causes the presenter arm 38 to achieve the stowed condition, allowing the webbing 12 to recede to the discreet location. When the SMA wire bundle 48 is heated to a temperature above its transformation temperature, it contracts causing the presenting finger 44 to move the webbing 12 to the presenting position. As previously mentioned, a strain relief mechanism 30 may be connected between the SMA wires 48 and the structure 18 to protect the wires 48 from being subjected to excessive stress or strain.

Alternatively, to effect a push force, it is appreciated that the SMA bundle 48 could be replaced by a shape memory spring having a spring constant, when in the Martensite phase, less than that of the return spring 36, and a spring constant, in the Austenite phase, greater than the return spring constant. Here, the preferred return spring 36 is a compression spring that exerts a biasing force upon the mechanism 24 towards the deployed condition and the connections between the SMA spring and return spring are rigid. Finally, as previously mentioned, a latch 34 may be included to retain the engaging mechanism 24 in the deployed condition when the power supply/signal source 56 for heating the SMA wires 48 is turned off.

Figure 4:
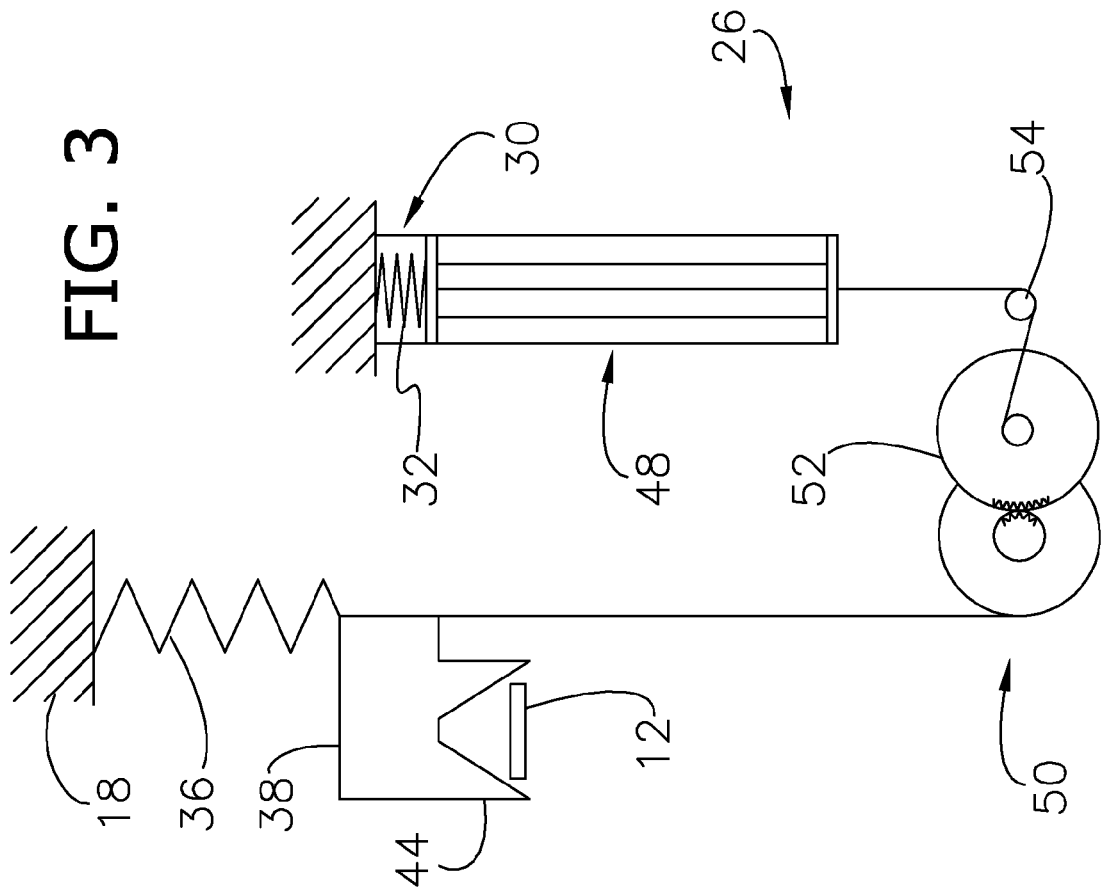
FIG. 4 is a schematic elevation of a seat belt webbing presenter having pivoting fingers, and a shape memory wire element drivenly coupled to the fingers in clasped (shown in solid-line type) and opened conditions, in accordance with a preferred embodiment of the invention.

In FIG. 4, the presenter arm 38 defines a rotational axis p parallel to the lateral direction of the vehicle (not shown). Similar to FIGS. 2-2b, the arm 38 presents a pair of cooperatively functioning and pivotal fingers 44 at or near the distal end 38b of the arm 38. More particularly, the fingers 44 are pivotal between the clasped condition shown in solid-line type, wherein the fingers 44 define longitudinal axes generally perpendicular to that of the arm 38, and an open condition, wherein the axes are generally parallel to the longitudinal axis of the arm 38. The webbing 12 is engagable by the fingers 44, when in the clasped condition.

In this configuration, the preferred shape memory element 28 is further drivenly coupled to each finger 44 on opposite sides of the pivot axes defined thereby (FIG. 4), so that upon contraction the upper finger is caused to swing downward and the upper finger is caused to swing upward, as illustrated. That is to say, a single SMA wire 28 may be operably connected to the fingers 44 and arm 38, and configured to cause the fingers 44 to pivot towards the clasped condition as the arm 38 is caused to translate. More preferably, activation of the wire 28 rotates the fingers 44 before rotating the arm 38. Alternatively, it is appreciated that activation may be used to pivot the fingers 44 towards a stowed condition, for example, by reversing the pivot axes of the fingers 44, wherein a return/biasing spring (not shown) works oppositely to drive the fingers 44 towards the clasped condition, and is selectively released.

In the embodiment shown in FIGS. 5a,b, the engaging mechanism 24 is composed of a safety webbing sleeve 16 that is pivotally connected to fixed structure 18, or a slider 40 as previously presented. A prong 58 is fixedly attached to the sleeve 16 and orthogonally intercepts the pivot axis, p. The actuator 26 generally consists of at least one shape memory wire 28 connected to the distal end of the prong 58 and to the fixed structure 18 at the other end. Alternatively, the actuator 26 may be attached to the sleeve 16 directly without the need for prong 58. It is appreciated that instead of attaching the actuator 26 to the sleeve, the actuator 26 may be attached to a presenting arm, which is configured to move the webbing 12 and/or sleeve 16 from the stowed position to the presenting position when activated. The actuator 26 may also be attached to the sleeve or presenting arm through linkages, levers, gears and/or pulleys. In this preferred embodiment, the element 28 may include at least one and more preferably a plurality of SMA wires 28, so as to provide redundancy and added functionality. When caused to contract by a thermal activation signal, the wire 28 impart a linear force at the connection point of the prong 58, which causes a moment about the pivot axis. A strain relief spring 32 may be intermediately coupled between the wire 28 and structure 18 as shown (FIG. 5). It is appreciated that other energy storage/dissipating elements may be used in lieu of or in addition to the spring 36, such as a band of elastic material, or the belt retraction force caused by the safety belt tensioner (not shown).

Figure 6A:
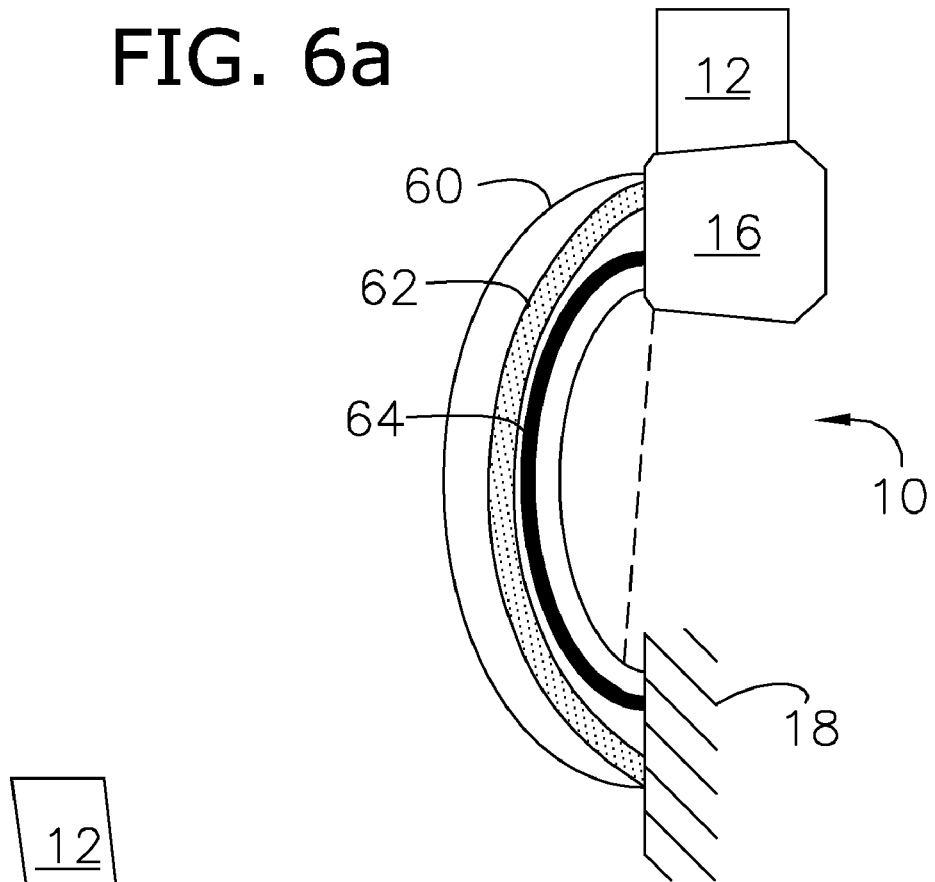
FIG. 6a is a side elevation of a seat belt webbing presenter including a flexible anchor or lap pre-tensioner sleeve engaging the webbing, and a shape memory rod actuator and flexure member coextensively coupled to the sleeve, shown in a stowed condition, in accordance with a preferred embodiment of the invention.
Figure 6B:
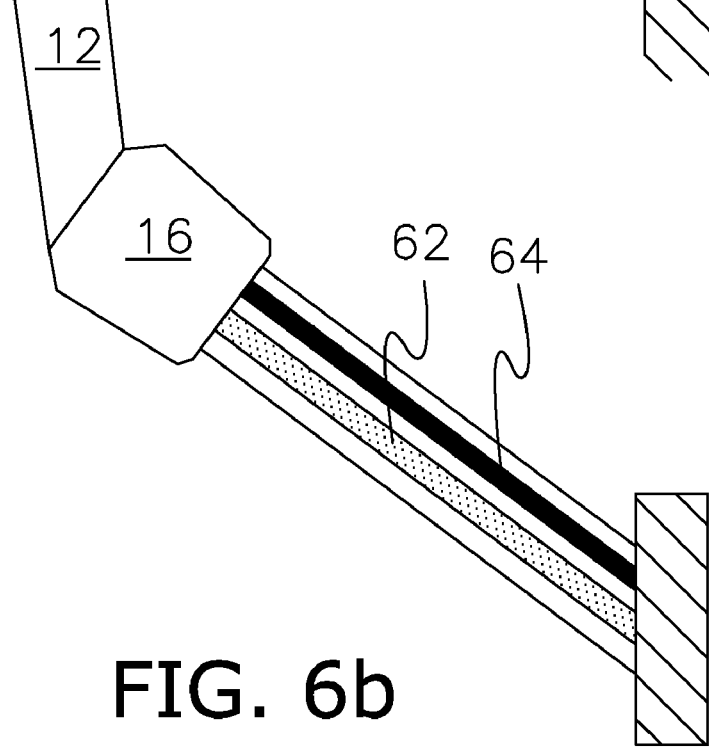
FIG. 6b is a side elevation of the presenter shown in FIG. 6a, wherein the actuator has been activated, and the sleeve caused to achieve a deployed condition.

In another embodiment, the sleeve 16 may be fixedly attached to the structure 18, but present a flexible, collapsing, telescoping, or the like configuration such that the webbing 12 is translatably attached to the structure 18. In FIG. 6, for example, the sleeve 16 is formed of one or more layers of malleable (e.g. pliable, etc.) material 60, such as a natural or woven fabric, skin, sheet, or sheath. The sleeve 16 includes an interior flexure member 64 that longitudinally co-extends with the layer(s) 60, and biases the sleeve 16 towards one of the stowed (FIG. 6a) and deployed configurations. The element 28 preferably consists of a resistively flexible shape memory (e.g., SMA) rod 62 that is connected to fixed structure 18 and configured to achieve deactivated and activated shapes that in turn change the shape of the sleeve 16. More particularly, in FIG. 6a, both the flexure member 64 and rod 62 are in a deactivated normally bent configuration; upon activation, the rod contracts and therefore straightens (FIG. 6b), so as to cause the member 64 and sleeve 16 to straighten, and the webbing 12 to re-position. Alternatively, it is appreciated that an external SMA wire 28 may be interconnected with and used in lieu of or addition to the rod 62 to cause an otherwise resistively flexible body, such as the flexible member 64, to selectively bow (as shown in hidden-line type in FIG. 6a).

In a preferred mode of automotive operation, the signal source 56 (FIGS. 1 and 1a) may be the charging system of a vehicle 66, and operable to generate and deliver to the element 28 a signal sufficient to activate the material. It is appreciated that the signal may be electrical, thermal, stress related, chemical, magnetic, or the like, depending upon the particular active material employed. In the illustrated embodiment, the element 28 is coupled to the source 56, via hardware or wireless technology. A controller 68 is intermediately coupled to the source 56 and element 28 and programmably configured to selectively cause the element 28 to be exposed to the signal. For example, the controller 68 may be configured to activate the element 28 for a predetermined period (e.g. 10 seconds) upon receipt of an input signal, wherein the input signal results, for example, from starting the vehicle 66. Where a plurality of wires 48 are utilized, the preferred controller 68 may be separately coupled to, so as to individually control each wire. This results in the ability to vary the actuation force and/or period.

More preferably, at lease one sensor 70 operable to detect a condition of interest, is communicatively coupled and configured to send the input signal to the controller 68 when the condition is detected. More particularly, the controller 68 and sensor 70 are cooperatively configured to determine when a webbing deployment situation occurs, either when the condition is detected, or a non-compliant condition is determined through further comparison to a predetermined condition threshold. Where an occurrence is found, the element 28 is exposed to the signal until activated, so as to present the webbing 12. In the alternative, the reverse may be applied for stowing, wherein a latch release is actuated to effect selective deployment.

Figure 1A:
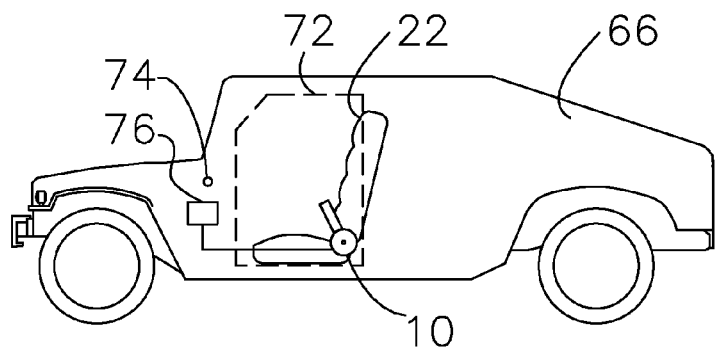
FIG. 1a is a side elevation of a vehicle including a seat and safety belt presenter system, in accordance with a preferred embodiment of the invention.

The triggering condition may be the act of opening or closing a vehicle door 72, occupying the passenger seat 22, fastening or unfastening the buckle, turning the ignition switch 74 on or off, shifting the vehicle gear 76 to park or neutral, shifting the gear 76 from park or neutral, stopping the vehicle 66, moving the vehicle 66, or any combination of the above (FIG. 1*a*). Once the element 28 is activated, the preferred controller 68 is configured to discontinue the signal after a predetermined period (e.g. 10 seconds), so as to present sufficient opportunity for the occupant to fasten his or her safety belt. Alternatively, it is appreciated that where thermally activated elements 28 are employed, a delayed return resulting in an equivalent deployment period may be accomplished by insulating the element 28 such that the cooling rate is reduced.

Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Suitable algorithms, processing capability, and sensor inputs are well within the skill of those in the art in view of this disclosure. This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. An autonomous safety webbing presenter adapted for use with a structure and a safety webbing, said presenter comprising:
    an engaging mechanism drivenly coupled to the safety webbing, and translatable, so as to be caused to achieve deployed and stowed conditions, relative to the structure, wherein the webbing is caused to achieve deployed and stowed conditions respectively;
    an actuator including at least one active material element operable to undergo a reversible change in fundamental property when exposed to or occluded from an activation signal, so as to be activated and deactivated respectively, and drivenly coupled to the mechanism, so as to cause the mechanism to translate to one of the deployed and stowed conditions as a result of the change; and
    a source operable to generate the signal, so as to expose the element thereto,
    wherein the actuator further includes a strain relief mechanism operatively coupled to the element.

2. The presenter as in claim 1, wherein the mechanism is pivotally coupled to the structure, so as to define an axis of rotation, the actuator is operable to produce a moment about the axis and the mechanism is composed of a rigid material, such that the moment is able to cause the mechanism to pivot about the axis.

3. The presenter as in claim 1, wherein the mechanism is fixedly connected to the structure, includes a flexible member, and defines a free engaging end, and the active material element is drivenly coupled to the member, such that activation of the element causes the mechanism to flex, the end to translate, and the webbing to achieve one of the deployed and stowed conditions.

4. The presenter as in claim 1, wherein the mechanism is an anchor or lap pretensioner sleeve.

5. The presenter as in claim 1, wherein the active material element is a shape memory alloy spring having a first spring constant when deactivated and a second constant greater than the first when activated.

6. The presenter as in claim 1, wherein the element is thermally activated and insulated, such that after the activation signal is ceased, the element remains activated for a predetermined period.

7. The presenter as in claim 1, further comprising:
    at least one gear, pulley, linkage or lever intermediately coupled to the mechanism and actuator, wherein the change exerts a force upon the mechanism, the force causes the mechanism to displace, and the gear, pulley, linkage or lever is configured to transmit or amplify the force or displacement.

8. The presenter as in claim 1, wherein said at least one element presents a geometric shape selected from the group consisting essentially of a wire, a spring, a strip, a cable, and a rolled sheet.

9. The presenter as in claim 1, wherein the element is formed of an active material selected from the group consisting essentially of shape memory alloys, electroactive polymers, piezoceramics, piezopolymers, electrostrictives, and magnetostrictives.

10. An autonomous safety webbing presenter adapted for use with a structure and a safety webbing, said resenter comprising:
    an engaging mechanism drivenly coupled to the safety webbing, and translatable, so as to be caused to achieve deployed and stowed conditions, relative to the structure, wherein the webbing is caused to achieve deployed and stowed conditions respectively;

an actuator including at least one active material element operable to undergo a reversible change in fundamental property when exposed to or occluded from an activation signal, so as to be activated and deactivated respectively, and drivenly coupled to the mechanism, so as to cause the mechanism to translate to one of the deployed and stowed conditions as a result of the change;

a source operable to generate the signal, so as to expose the element thereto; and a latch configured to selectively engage the mechanism, so as to retain the mechanism in one of the said deployed and stowed conditions, when the change is reversed.

11. The presenter as claimed in claim 10, wherein the latch is selected from the group consisting essentially of an electromagnetic latch, permanent magnet latch, MR based latch, and an active material actuated spring loaded pin latch.

12. The presenter as claimed in claim 1, further comprising:

at least one sensor configured to detect a vehicle condition, and communicatively coupled to the actuator and source, said sensor and source being cooperatively configured to generate the signal only when the condition is detected.

13. The presenter as claimed in claim 12, wherein the sensor is operable to detect and the condition is a seat occupation, door opening, door closing, ignition on, ignition off, vehicle gear in park or neutral, vehicle gear not in park or neutral, vehicle stationary, vehicle moving, seatbelt buckling or unbuckling event, or any combination of the above.

14. An autonomous safety webbing presenter adapted for use with a structure and a safety webbing, said presenter comprising:

an engaging mechanism drivenly coupled to the safety webbing, and translatable, so as to be caused to achieve deployed and stowed conditions, relative to the structure, wherein the webbing is caused to achieve deployed and stowed conditions respectively;

an actuator including at least one active material element operable to undergo a reversible change in fundamental property when exposed to or occluded from an activation signal, so as to be activated and deactivated respectively, and drivenly coupled to the mechanism, so as to cause the mechanism to translate to one of the deployed and stowed conditions as a result of the change; and a source operable to generate the signal, so as to expose the element thereto, wherein the mechanism includes a translatable arm defining a distal end, drivenly coupled to the element, and presenting a plurality of fingers at the distal end, wherein the fingers are configured to entrain the webbing and caused to achieve one of the deployed and stowed conditions, when the arm is translated.

15. The presenter as claimed in claim 14, wherein the mechanism includes:

a guide rail fixedly connected to the structure, a slider operable to move along the guide rail, and coupled to the arm, so as to cause the arm and fingers to translate when the slider moves;

the element is drivenly coupled to the slider, such that the change causes the slider to move along the rail, and the fingers to achieve said one of the deployed and stowed conditions.

16. The presenter as claimed in claim 14, wherein the fingers are shiftable between opened and clasped conditions, and at least one finger is drivenly coupled to a second active material element operable to undergo a second reversible change in fundamental property when exposed to or occluded from an activation signal, such that the second change causes the fingers to shift to one of the opened and clasped conditions.

17. The presenter as claimed in claim 16, wherein first and second fingers are pivotally connected to the presenter arm, and caused to rotate inwardly so as to cooperatively achieve the clasped condition, as a result of the change.

18. The presenter as claimed in claim 16, wherein the fingers are drivenly coupled to a return, and the return acts antagonistically to the second element, so as to cause the fingers to shift to the other of the opened and clasped conditions, when the second change is reversed.

19. The presenter as claimed in claim 16, wherein the first and second elements are integrally presented, such that a single element is operable to shift the fingers and translate the arm.

20. The presenter as claimed in claim 1, further comprising:

a return drivenly coupled to the mechanism antagonistically to the actuator, so as to exert a biasing force upon the mechanism operable to cause the mechanism to translate to the other of the deployed and stowed conditions when the change is reversed.

21. The presenter as claimed in claim 20, wherein the return is selected from the group consisting essentially of pre-tensioning in the webbing, a spring, and a flexure member.

* * * * *